(12) United States Patent
Liang et al.

(10) Patent No.: US 11,021,599 B1
(45) Date of Patent: *Jun. 1, 2021

(54) ETHYLENE-VINYL ALCOHOL COPOLYMER RESIN COMPOSITION, FILM, AND MULTI-LAYER STRUCTURE COMPRISING THE SAME, AS WELL AS METHODS THEREOF

(71) Applicant: Chang Chun Petrochemical Co., Ltd., Taipei (TW)

(72) Inventors: Chih Chieh Liang, Taipei (TW); Wen Hsin Lin, Taipei (TW); Chao Hsiang Hsu, Taipei (TW)

(73) Assignee: CHANG CHUN PETROCHEMICAL CO., LTD, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,587

(22) Filed: Aug. 21, 2020

Related U.S. Application Data

(63) Continuation-in-part of application No. 16/726,552, filed on Dec. 24, 2019.

(51) Int. Cl.

| C08L 29/04 | (2006.01) |
|---|---|
| C08F 216/06 | (2006.01) |
| C09J 7/29 | (2018.01) |
| B32B 27/08 | (2006.01) |
| B32B 7/12 | (2006.01) |
| B32B 27/32 | (2006.01) |
| B32B 27/30 | (2006.01) |
| B32B 27/34 | (2006.01) |

(52) U.S. Cl.
CPC ............. *C08L 29/04* (2013.01); *B32B 7/12* (2013.01); *B32B 27/08* (2013.01); *B32B 27/306* (2013.01); *B32B 27/32* (2013.01); *B32B 27/34* (2013.01); *C09J 7/29* (2018.01); *B32B 2307/7244* (2013.01); *B32B 2439/70* (2013.01); *C09J 2301/122* (2020.08); *C09J 2301/162* (2020.08); *C09J 2301/414* (2020.08)

(58) Field of Classification Search
None
See application file for complete search history.

(56) References Cited

U.S. PATENT DOCUMENTS

| 5,356,990 | A | * | 10/1994 | Pucci ...................... C08L 23/04 |
|---|---|---|---|---|
| | | | | 525/57 |
| 5,972,447 | A | | 10/1999 | Hata |
| 6,503,588 | B1 | | 1/2003 | Hayashi et al. |
| 7,534,829 | B2 | | 5/2009 | Tai et al. |
| 2003/0018114 | A1 | | 1/2003 | Tai |
| 2010/0289172 | A1 | * | 11/2010 | Fujimura ................. C08J 3/215 |
| | | | | 264/148 |
| 2015/0152256 | A1 | | 6/2015 | Nakazawa et al. |

FOREIGN PATENT DOCUMENTS

| EP | 3088431 A1 | 11/2016 |
|---|---|---|
| JP | 2001342202 A | 12/2001 |
| JP | 2018150529 A | 9/2018 |
| TW | I568563 B | 2/2017 |
| TW | 201708358 A | 3/2017 |

* cited by examiner

*Primary Examiner* — Sheeba Ahmed
(74) *Attorney, Agent, or Firm* — Polsinelli PC

(57) ABSTRACT

Ethylene-vinyl alcohol copolymer resin composition pellet(s), films, and multi-layer structure formed therefrom, as well as methods for preparing such ethylene-vinyl alcohol copolymer resin composition pellets are provided herein. The ethylene-vinyl alcohol copolymer resin composition typically comprises at least two melting point temperatures, and a boron compound, wherein the ethylene-vinyl alcohol copolymer resin composition has a boron content of about 25 to about 300 ppm and has an iodine dyed region of about 0.1 mm$^2$ or less after dripping 0.01 mL of iodine solution on the surface of the ethylene-vinyl alcohol copolymer resin composition, dipping the ethylene-vinyl alcohol copolymer resin composition into water for 5 seconds, and drying at a temperature of 120° C. for 2 hours.

13 Claims, 5 Drawing Sheets

ETHYLENE-VINYL ALCOHOL COPOLYMER RESIN COMPOSITION, FILM, AND MULTI-LAYER STRUCTURE COMPRISING THE SAME, AS WELL AS METHODS THEREOF

CROSS-REFERENCE TO RELATED APPLICATIONS

This application is a continuation in-part of U.S. application Ser. No. 16/726,552, filed on Dec. 24, 2019, entitled, ETHYLENE-VINYL ALCOHOL RESIN, FILM, AND MULTI-LAYER STRUCTURE COMPRISING THE SAME, AND METHOD FOR FORMING THE ETHYLENE-VINYL ALCOHOL RESIN, which is hereby expressly incorporated herein by reference in its entirety.

FIELD OF THE DISCLOSURE

The instant disclosure is directed ethylene-vinyl alcohol copolymer ("EVOH") resin, which can form a film that has a high uniform gas barrier and also can form a multi-layer that provides improved gas barrier. Methods for preparing such EVOH resin and forming films therefrom are also described herein.

BACKGROUND OF THE DISCLOSURE

EVOH resin is widely used in laminates for preserving perishable items. For example, EVOH resin and laminates are commonly used by the food packaging industry, medical device and supplies industry, pharmaceutical industry, electronics industry, and agricultural chemicals industry. EVOH resins are often incorporated as a distinct layer within a laminate to serve as an oxygen-barrier layer.

Laminates having a distinct EVOH layer are typically produced by coextruding EVOH with other types of polymers. EVOH resin exhibit rheological properties similar to other resins allowing it to be coextruded with polyolefins, polyamides, nylons, polystyrene, polyvinyl chloride, polyesters, and thermoplastic polyurethanes using conventional extrusion equipment. EVOH resin, however, often exhibit poor adhesion to other polymers, including, e.g., some of the above polymers. Thus, adhesive resins, called "tie resins," are used to bond the EVOH layer to an adjacent layer in co-extrusion. Some nylons and thermoplastic polyurethanes, however, will adhere directly to EVOH without the use of tie resin.

Additionally, EVOH resin having a lower ethylene content usually provide a better degree of crystallization and better gas-barrier properties, but typically provide inferior mechanical properties. Conversely, EVOH resins having a higher ethylene content usually provide better mechanical properties, but provide inferior gas-barrier properties.

To produce an EVOH resin that has both high mechanical properties and high gas-barrier properties at the same time, usually two kinds of EVOH resins with different ethylene content are mixed together. However, in the past, this process produced an EVOH product with poor uniformity, which was an on-going problem

SUMMARY OF THE DISCLOSURE

Aspects of the instant disclosure are directed to ethylene-vinyl alcohol copolymer ("EVOH") resin composition, which can form a film that provides highly uniform gas barrier properties and also can form a multi-layer that provides improved gas barrier, visual appearance, and thickness deviation. Additional aspects are directed to methods for preparing such EVOH resin and forming films therefrom.

According to an aspect of the disclosure, provided is an ethylene-vinyl alcohol copolymer ("EVOH") resin composition including at least two melting point temperatures and a boron compound, wherein the EVOH resin composition has a boron content of about 25 to about 300 ppm, and the EVOH resin composition has an iodine dyed region of 0.1 $mm^2$ or less after dripping 0.01 mL of iodine solution on the surface of the ethylene-vinyl alcohol copolymer resin composition, dipping the ethylene-vinyl alcohol copolymer resin composition into water for 5 seconds, and drying at a temperature of 120° C. for 2 hours. The inventors discovered that good uniformity of the ethylene content can be assessed and controlled by applying an iodine solution to the EVOH resin (e.g., pellet or film) and determining the absorption of iodine into the EVOH resin. Due to the different ethylene contents of an EVOH resin composition having different absorption of the iodine solution, the inventors discovered that the uniformity of different ethylene content can be determined by assessing the size of the dyed region. Poor uniformity of a film is believed to lead to drastic decreases in the oxygen transmission rate at certain regions of the film; therefore, the film typically includes an undesirably high standard deviation of oxygen transmission rate.

The EVOH resin composition may, preferably, have a boron content of about 30 to about 300 ppm. In some cases, the iodine dyed region is 0.02 $mm^2$ or less. The EVOH resin composition may have a difference of the at least two melting point temperatures that is about 10° C. to about 44° C. In at least one instance, the difference of the at least two melting point temperatures is about 15° C. to about 41° C. One of the at least two melting point temperatures of the EVOH resin composition may be from 142° C. to 177° C. Additionally or alternatively, one of the at least two melting point temperatures of the EVOH resin composition may be from 179° C. to 195° C.

The EVOH resin composition may have a first ethylene content and a second ethylene content, where the second ethylene content is different from the first ethylene content. For example, the first ethylene content may be in the range of about 20 to about 35 mole % and the second ethylene content may be in the range of about 36 to about 65 mole %.

In some cases, the EVOH resin includes an alkali metal, wherein the alkali metal content of the EVOH resin is from 50 to 400 ppm.

In accordance with another aspect of the disclosure, provided is an ethylene-vinyl alcohol copolymer resin composition in the form of a film having at least two melting point temperatures, and a boron compound, wherein the EVOH resin composition has a boron content of about 25 to about 300 ppm and has an iodine dyed region of 1000 $um^2$ or less after dripping 0.01 mL of iodine solution on the surface of the ethylene-vinyl alcohol copolymer resin composition, then dipping the ethylene-vinyl alcohol copolymer resin composition into water for 5 seconds, and drying at a temperature of 120° C. for 2 hours The EVOH resin composition in the form of a film preferably has a difference of the at least two melting point temperatures that is about 15° C. to about 45° C. One of the at least two melting point temperatures of EVOH resin composition in the form of a film may be from 179° C. to 195° C. Additionally or alternatively, one of the at least two melting point temperatures of the EVOH resin composition in the form of a film may be from 142° C. to 177° C.

In accordance with a further aspect of the disclosure, multi-layer structures are provided typically having at least one layer formed from the EVOH resin compositions disclosed herein; at least one polymer layer; and at least one adhesive layer. In some cases, the polymer layer is selected from the group consisting of a low density polyethylene layer, a polyethylene-graft-maleic-anhydride layer, a polypropylene layer, and a nylon layer and the adhesive layer is a tie layer.

BRIEF DESCRIPTION OF THE DRAWING

Implementation of the present technology will now be described, by way of example only, with reference to the attached figures, wherein.

Figure 1:
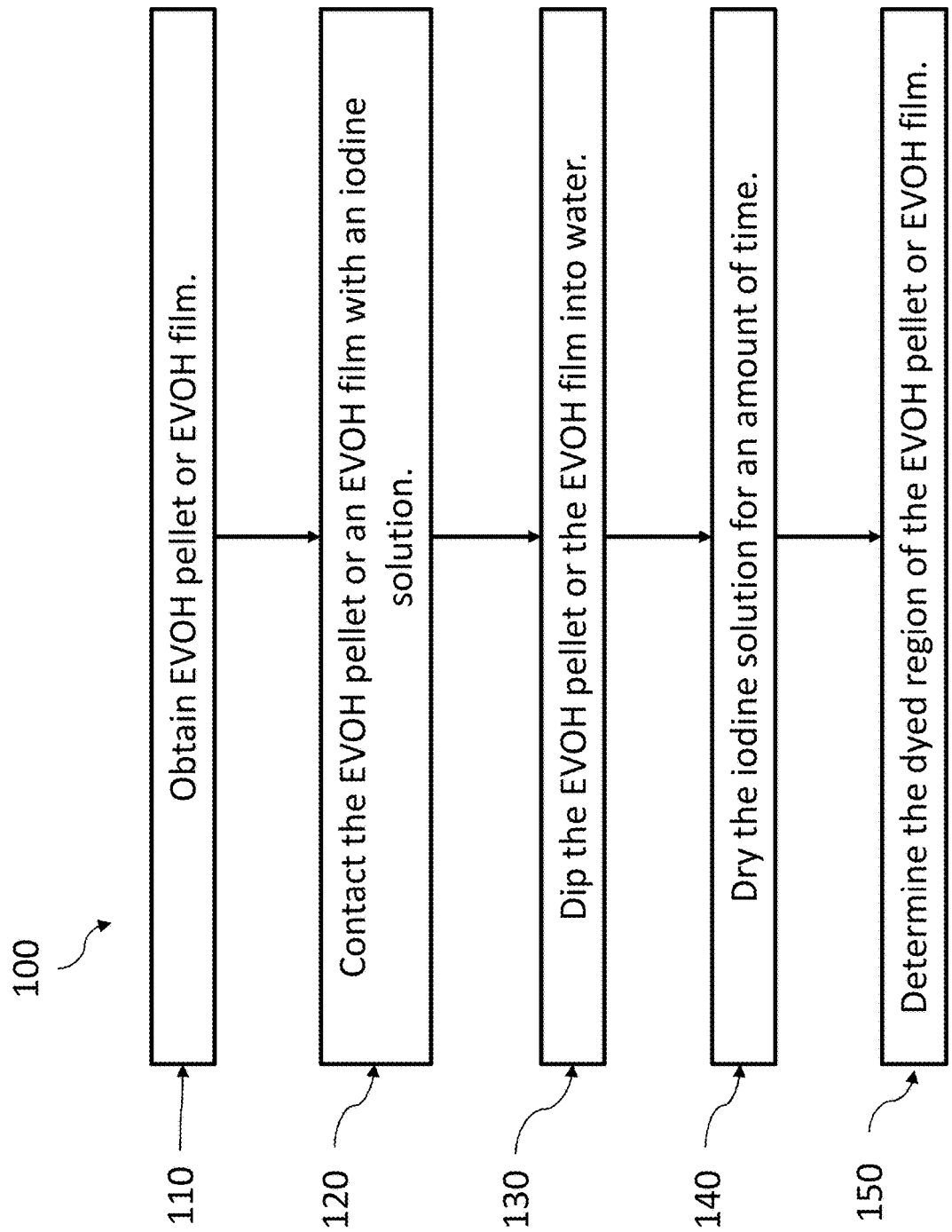
FIG. 1 is a schematic depicting an exemplary method for evaluating EVOH resin composition in accordance with aspects of the disclosure.

It should be understood that the various aspects are not limited to the arrangements and instrumentality shown in the drawings.

DETAILED DESCRIPTION OF THE DISCLOSURE

Aspects of the instant disclosure are directed to ethylene-vinyl alcohol copolymer ("EVOH") resin composition, which may be in the form of pellet(s) (sometimes referred to as "EVOH pellet(s)" in this disclosure). Although an EVOH resin composition in the form of one or more EVOH pellet(s) is described throughout the instant disclosure, the EVOH resin compositions may be in the form of beads, cubes, chips, shavings, or the like. Additional aspects of the disclosure are directed to EVOH films and multi-layer structure that have highly uniform gas barrier properties. Further aspects of the disclosure are directed to methods for preparing such EVOH resin composition and forming films therefrom.

FIG. 1 illustrates a brief overview, method 100 includes the step of contacting the EVOH pellet or an EVOH film with an iodine solution, dipping the EVOH pellet or the EVOH film into water, drying the iodine solution for an amount of time, and determining the dyed region of the EVOH pellet or EVOH film.

In step 110, an EVOH pellet or EVOH film is obtained. Typically, the EVOH pellet is formed from the EVOH resin compositions disclosed herein.

In step 120, the EVOH pellet or EVOH film contacts an iodine solution. Preferably, the iodine solution is dripped onto the EVOH pellet or EVOH film. For example, about 0.01 mL of iodine solution may be dripped onto the EVOH pellet. Although not particularly limited to any specific amount of iodine solution, method 100 may include dripping about 0.005 mL to about 0.01 mL, about 0.01 mL to about 0.015 mL, about 0.015 ml to about 0.02 mL, about 0.02 ml to about 0.03 mL, about 0.03 ml to about 0.04 mL, about 0.04 ml to about 0.05 mL, about 0.05 ml to about 0.06 mL, about 0.06 ml to about 0.07 mL, etc. onto the EVOH pellet or EVOH film. In some cases, the iodine solution may contact the EVOH pellet or EVOH film for 1 to 5 seconds, 5 to 10 seconds, 10 to 20 seconds, 20 to 30 seconds, 30 seconds to 45 seconds, 45 to 60 seconds, 60 to 90 seconds, 90 to 120 seconds, or any of the ranges or subranges therebetween. The iodine solution may comprise: 8 g $I_2$+2 g KI+70 g $H_2O$. In some cases, where the EVOH resin composition is in the form of a pellet, the EVOH pellet is cut, e.g., along the cross section of the long diameter or short diameter of the EVOH pellet. Typically, the cross section of the EVOH pellet is 1.5 to 4.5 mm$^2$ by a microtome. The EVOH pellet may be cut to form a 10 mg sample of such EVOH pellet, although the weight of the sample of EVOH pellet is not particularly limited. Preferably, the iodine solution contacts (e.g., is dripped onto) the cut surface of the EVOH pellet.

In step 130, the EVOH pellet or film having the iodine solution is dipped into water. Desirably, by the dipping the EVOH pellet or film into water, superfluous amounts of iodine solution are removed. In some instances, the EVOH pellet or film is sprayed with water instead of being dipped into a water bath. The iodine solution may reside on the EVOH pellet or film for about 1 second to 5 minutes before the EVOH pellet or film is dipped into water. For example, the iodine solution may reside on the EVOH pellet or film for about 1 to about 10 seconds, 2.5 to about 7.5 seconds, about 5 to about 15 seconds, about 15 to about 30 seconds, about 30 to about 45 seconds, about 45 to about 60 seconds, about 60 to about 90 seconds, about 90 to about 120 seconds, about 2 to about 3 minutes, about 3 to about 4 minutes, about 4 to about 5 minutes, including ranges and subranges thereof.

In step 140, iodine solution on the EVOH pellet or the EVOH film is dried for an amount of time. The iodine solution may contact the cut surface of EVOH pellet or EVOH film for about 15 seconds before the EVOH pellet or EVOH film is placed in an oven at a temperature of about 120° C. for 2 hours. Temperature of the oven for drying the EVOH pellet or EVOH film may vary, but is typically in the range of 80° C. to 160° C., preferably 90° C. to 150° C., or preferably 100° C. to 140° C. In some cases, the EVOH pellet or EVOH film is dried in the oven for about 1 hour, about 2 hours, about 3 hours, about 4 hours, or any range therebetween, based on the temperature of the oven and/or amount of iodine solution on the EVOH pellet or EVOH film.

In step 150, the dyed region of the EVOH pellet or EVOH film is determined. The dyed region, as used herein, is the area where the gray value of such area differs from the average gray scale value of the marine area by more than 15 (e.g., by differing between ±15). The gray value may be determined from five random points in the marine area of the cut surface of the EVOH pellet or of the EVOH film under the lens, e.g., using OM analysis software to determine the gray scale value. The gray scale value is calculated using the following formula:

Gray scale=$R*0.299+G*0.587+B*0.114$.

The marine area is defined as the region with lighter color in the OM for the preliminary analysis. The OM analysis software may be utilized to measure the size of area. The dyed region of an EVOH pellet is preferably about 0.1 mm$^2$ or less, about 0.09 mm$^2$ or less, about 0.08 mm$^2$ or less, about 0.07 mm$^2$ or less, about 0.06 mm$^2$ or less, about 0.05 mm² or less, about 0.04 mm² or less, about 0.03 mm² or less, about 0.02 mm² or less, about 0.01 mm² or less, about 0.009 mm² or less, or about 0.008 mm² or less.

In at least on instance, the testing area for the EVOH film is 32,000 um²; although the testing area may be more or less than 32,000 um² in other instances. Preferably, the dyed region of the EVOH film is about 1000 um² or less, about 950 um² or less, about 900 um² or less, about 850 um² or less, about 800 um² or less, about 750 um² or less, about 700 um² or less, about 650 um² or less, about 600 um² or less, about 550 um² or less, about 500 um² or less, about 450 um² or less, about 400 um² or less, about 350 um² or less, about 300 um² or less, about 250 um² or less, about 200 um² or less, about 150 um² or less, or about 100 um² or less.

In some cases, method 100 may be used to control the uniformity of the ethylene content of the EVOH resin composition. The inventors discovered that good uniformity of the ethylene content of an EVOH resin composition can assessed and controlled by determining the absorption of iodine into the EVOH resin composition in the form of a pellet or film. In some cases, method 100 may include discarding an EVOH resin compositions having an undesirable dyed region or selecting an EVOH resin composition having a desirable dyed region in the form of an EVOH pellet or EVOH film.

In accordance with an aspect of the disclosure, provided are ethylene-vinyl alcohol copolymer ("EVOH") resin composition, which may be in the form of pellet(s). As used herein, EVOH pellets refer to an EVOH resin that is in the form and/or shape of one or more pellets. Typically, the EVOH resin composition includes at least two melting point temperatures, and a boron compound, wherein the EVOH resin composition has a boron content of about 25 to about 300 ppm, and the EVOH resin composition has an iodine dyed region of about 0.1 mm² or less after dripping 0.01 mL of iodine solution on the surface of the ethylene-vinyl alcohol copolymer resin composition, dipping the ethylene-vinyl alcohol copolymer resin composition into water for 5 seconds, and drying at a temperature of 120° C. for 2 hours. As noted above, the dyed region of the EVOH pellet formed from the EVOH resin composition is preferably about 0.1 mm² or less, about 0.09 mm² or less, about 0.08 mm² or less, about 0.07 mm² or less, about 0.06 mm² or less, about 0.05 mm² or less, about 0.04 mm² or less, about 0.03 mm² or less, about 0.02 mm² or less, about 0.01 mm² or less, about 0.009 mm² or less, or about 0.008 mm² or less.

Without being limited to any specific theories, it is believed that an EVOH pellet having a preferable dyed region, such as those discussed above, may be obtained when: the pelleting of the EVOH resin includes using cooling water having a temperature of 5° C. or less; the EVOH pellets have a boron content of 30 to 250 ppm; and the EVOH pellet have a alkali metal content of 50 to 400 ppm. Additionally, the inventors realized that the more times the EVOH pellet was melted, the dyed region became undesirable, such that in some instances it is preferable to not melt the EVOH resin or pellets thereof by heat processes more than once.

The EVOH resin composition or pellets thereof have at least two melting point temperatures typically ranging from about 142° C. to about 195° C. Preferably, one of the at least two melting point temperatures of the EVOH resin is in the range of about 142° C. to about 177° C., e.g., about 145° C. to about 175° C. or about 148° C. to about 172° C. Additionally or alternatively, one of the at least two melting point temperatures of the EVOH resin composition is preferably in the range of about 179° C. to about 192° C., e.g., about 181° C. to about 189° C. or about 183° C. to about 187° C. In some instances, the EVOH copolymer resin composition have at least three different melting point temperatures. In other instances, the EVOH resin composition includes at least four, at least five, or at least six different melting point temperatures.

The difference of the at least two melting point temperatures is preferably in the range of about 10° C. to about 44° C., e.g., about 10° C. to about 41° C. about 15° C. to about 41° C., about 15° C. to about 35° C., or about 18° C. to about 32° C. Without being limited to a specific theory, the inventors discovered that when the difference between the at least two melting point temperatures is out of the foregoing preferable ranges, the ethylene contents of the EVOH forming the EVOH resin composition or pellet thereof are too different, which may result in poor miscibility and/or result in inferior characteristics for a thermoformed multi-layer formed therefrom. For example, if the ethylene contents of the EVOH forming the EVOH resin composition or pellet thereof are too close, multi-layer structures thermoformed from the EVOH resin composition or EVOH pellet may have inferior characteristics.

The EVOH resin composition are typically formed of at least a first EVOH having a first ethylene content and a second EVOH having a second ethylene content, where the second ethylene content is different from the first ethylene content. For example, the first ethylene may be in the range of about 20 to about 35 mole % and the second ethylene content may be in the range of about 36 to about 65 mole %. In some instances, the first ethylene content ranges from about 20 to about 35 mole %, about 22 to about 35 mole %, about 24 to about 35 mole %, about 28 to about 35 mole %; about 20 to about 34 mole %, about 22 to about 34 mole %, about 24 to about 34 mole %, about 28 to about 34 mole %; about 20 to about 32 mole %, about 22 to about 32 mole %, about 24 to about 32 mole %, about 28 to about 32 mole %; about 20 to about 30 mole %, about 22 to about 30 mole %, about 24 to about 30 mole %, or about 28 to about 30 mole %. Additionally or alternatively, the second ethylene content of the EVOH resin may be about 36 to about 65 mole %, about 40 to about 65 mole %, about 42 to about 65 mole %, about 44 to about 65 mole %; about 36 to about 60 mole %, about 40 to about 60 mole %, about 42 to about 60 mole %, about 44 to about 60 mole %; about 36 to about 55 mole %, about 40 to about 55 mole %, about 42 to about 55 mole %, about 44 to about 55 mole %; about 36 to about 50 mole %, about 40 to about 50 mole %, about 42 to about 50 mole %, or about 44 to about 50 mole %.

In some instances, the EVOH resins have a boron content of 25 to 300 ppm. For example, the boron content of the EVOH resin composition may range from 30 to 250 ppm, 50 to 200 ppm or 60 to 230 ppm. The EVOH resin composition may be formulated to have an amount of boron content that reduces the amount of crystallized structure within the EVOH resin composition or pellet formed therefrom. Additionally, the EVOH resin composition may have an amount of alkali metal ranging from 50 to 400 ppm. In some instances, the amount of alkali metal present in the EVOH resin composition is from about 50 to about 380 ppm, about 80 to about 370 ppm, about 140 to about 360 ppm, about 250 to about 350 ppm, about 260 to about 340 ppm, about 270 to about 330 ppm, about 280 to about 320 ppm, or about 290 to about 310 ppm.

According to a further aspect of the disclosure, provided is an EVOH film formed from an EVOH resin, such as the EVOH resin composition disclosed herein, having at least two melting point temperatures and a boron compound, wherein the ethylene-vinyl alcohol copolymer resin composition has a boron content of about 25 to about 300 ppm, and the EVOH resin composition has an iodine dyed region of about 1000 um$^2$ or less afterdripping 0.01 mL of iodine solution on the surface of an EVOH film, dipping the EVOH film into water for 5 seconds, and drying at a temperature of 120° C. for 2 hours. The EVOH film may be formed from the EVOH resin composition disclosed herein using conventional processes and equipment, such as an extruder.

Preferably, the dyed region of an EVOH film is about 1000 um$^2$ or less, about 950 um$^2$ or less, about 900 um$^2$ or less, about 850 um$^2$ or less, about 800 um$^2$ or less, about 750 um$^2$ or less, about 700 um$^2$ or less, about 650 um$^2$ or less, about 600 um$^2$ or less, about 550 um$^2$ or less, about 500 um$^2$ or less, about 450 um$^2$ or less, about 400 um$^2$ or less, about 350 um$^2$ or less, about 300 um$^2$ or less, about 250 um$^2$ or less, about 200 um$^2$ or less, about 150 um$^2$ or less, or about 100 um$^2$ or less.

The EVOH film may have at least two melting point temperatures typically ranging from about 142° C. to about 195° C. Preferably, one of the at least two melting point temperatures of the EVOH resin composition is from about 142° C. to about 177° C., e.g., 145° C. to about 175° C. or 148° C. to about 172° C. Additionally or alternatively, one of the at least two melting point temperatures of the EVOH resin composition is preferably from 179° C. to 195° C., e.g., 181° C. to 192° C. or 183° C. to 189° C. In some instances, the EVOH films have at least three different melting point temperatures. In other instances, the EVOH film includes at least four, at least five, or at least six different melting point temperatures.

The difference of the at least two melting point temperatures of the EVOH film is preferably from about 15° C. to about 45° C., e.g., about 17° C. to about 44° C. or about 20° C. to about 40° C. The inventors discovered that forming an EVOH film having at least two melting point temperatures with a difference between the at least two melting point temperatures of about 15° C. to about 45° C. may provide an EVOH film having a high uniformity of gas barrier properties.

In accordance with yet a further aspect of the disclosure, provided is a multi-layer structure having at least one layer formed from an EVOH resin composition, such as the EVOH resin compositions disclosed herein. Typically, the multi-layer structure includes at least one layer formed from the EVOH resin composition discussed herein; at least one polymer layer; and at least one adhesive layer.

The polymer layer may be chosen from a low density polyethylene layer, a polyethylene-graft-maleic-anhydride layer, a polypropylene layer, and a nylon layer. The adhesive layer may be a tie layer.

EXAMPLES

The following non-limiting examples are provided primarily for the purposes of elucidating the benefits and properties achieved by aspects of the invention.

Example 1

Preparation of Formulations

Exemplary and comparative ethylene-vinyl alcohol copolymer ("EVOH") formulations were prepared to elucidate certain benefits of the invention. Each of the exemplary and comparative EVOH formulations were prepared from at least two components. The at least two components of the exemplary and comparative formulations were either EVOH polymers or ethylene-vinyl acetate ("EVAC") polymers.

Exemplary Formulations A-C were each prepared from two EVAC components with different ethylene contents. Exemplary Formulation D was prepared from three EVAC components, each having a different ethylene content. Exemplary Formulations E-H were each prepared from two EVOH resin compositions with different ethylene contents.

Similarly, Comparative Formulations I, J, L and M were each prepared from two EVAC compositions with different ethylene contents. Comparative Formulation K, N and O was prepared from two EVOH resin compositions with different ethylene contents. Comparative Formulation P was prepared from dry blending of two EVOH pellets having two different ethylene contents. The ethylene content of the components used for preparing each of the Exemplary Formulations A-H and Comparative Formulations I-P is provided below in Table 1.

TABLE 1

|  | 1$^{st}$ Component Ethylene Content (mole %) | 2$^{nd}$ Component Ethylene Content (mole %) | 3$^{rd}$ Component Ethylene Content (mole %) | Ratio of 1$^{st}$ Comp. to 2$^{nd}$ Comp. to 3$^{rd}$ Comp. (1$^{st}$:2$^{nd}$:3$^{rd}$) |
|---|---|---|---|---|
| Exemplary Formulation A | 32% | 44% | — | 50:50 |
| Exemplary Formulation B | 32% | 60% | — | 75:25 |
| Exemplary Formulation C | 24% | 36% | — | 90:10 |
| Exemplary Formulation D | 29% | 48% | 60% | 70:5:25 |
| Exemplary Formulation E | 24% | 48% | — | 55:45 |
| Exemplary Formulation F | 35% | 60% | — | 60:40 |
| Exemplary Formulation G | 24% | 38% | — | 95:5 |
| Exemplary Formulation H | 24% | 38% | — | 5:95 |
| Comparative Formulation I | 24% | 75% | — | 75:25 |
| Comparative Formulation J | 32% | 38% | — | 75:25 |
| Comparative Formulation K | 32% | 44% | — | 75:25 |
| Comparative Formulation L | 29% | 44% | — | 90:10 |
| Comparative Formulation M | 32% | 44% | — | 50:50 |
| Comparative Formulation N | 24% | 38% | — | 4:96 |
| Comparative Formulation O | 24% | 44% |  | 96:4 |
| Comparative Formulation P | 32% | 48% | — | 75:25 75 25 |

EVOH pellets were produced from each of the exemplary and comparative formulations (Exemplary Formulations A-H and Comparative Formulations I-P) shown in Table 1 of Example 1.

Production of EVOH Resin for Exemplary Formulation A

For Exemplary Formulation A, the two components (EVAC polymers) were formed by polymerizing ethylene and vinyl acetate monomers. The two components were combined by solution mixing and subsequently saponified to form EVOH.

The EVOH was dissolved into an aqueous alcohol solution of methanol and water, having a methanol to water ratio of 60:40. The EVOH/methanol/water solution was maintained a temperature of 60° C. for one hour to promote the EVOH dissolving in the EVOH/methanol/water solution. The EVOH/methanol/water solution had a solid content of 41 wt. %.

The EVOH/methanol/water solution was pumped to a feeding tube with a 120 L/min flow rate and then passed to an inlet pipe having a diameter of 2.8 mm. The EVOH was cut by a rotating knife, which was rotating at 1,500 rpm, as the pellet was cooled by adding water having a temperature of 1.5° C., thereby forming the EVOH pellet through underwater pelletizing. The EVOH pellet was centrifuged to separate EVOH particles. The separated EVOH particles were washed with water and then immersed into a boron/sodium acetate solution, and subsequently dried to obtain the final product of an EVOH pellet. The final product of EVOH pellet included a boron content of 62 ppm, an alkali metal content of about 50 ppm and a long diameter of 3 mm and a short diameter 2.4 mm in a round shape.

Production of EVOH Resin for Exemplary Formulation B

An EVOH pellet was produced for Exemplary Formulation B, according to the formulation shown in Table 1, using a procedure similar to that used to produce the EVOH pellet of Exemplary Formulation A. However, for the production of the EVOH pellet of Exemplary Formulations B, the cooling water temperature was set as 2.5° C. The EVOH pellet of Exemplary Formulations B had a boron content of 85 ppm, alkali metal content of about 78 ppm and a long diameter of 3 mm and a short diameter of 2.4 mm in a round shape.

Production of EVOH Pellet for Exemplary Formulations C

An EVOH pellet was produced for Exemplary Formulation C, according to the formulation shown in Table 1, using a procedure similar to that used to produce the EVOH pellet of Exemplary Formulation A. However, to produce the EVOH pellet for Exemplary Formulation C, the EVOH/methanol/water solution was pumped to a feeding tube with a 60 L/min flow rate and then passed to an inlet pipe having a diameter of 2.5 mm. The EVOH was cut by a rotating knife, which was rotating at 1,000 rpm, as the pellet was cooled by adding water having a temperature of 0.5° C., thereby forming the EVOH pellet through strand cutting. The EVOH pellet of Exemplary Formulation C included a boron content of 113 ppm, alkali metal content of about 140 ppm and a diameter of 1.5 mm and a length of 5 mm with a cylindrical shape.

Production of EVOH Pellet for Exemplary Formulation D

An EVOH pellet was produced for Exemplary Formulation D, according to the formulation shown in Table 1, using a procedure similar to that used to produce the EVOH pellet of Exemplary Formulation A. However, in this case, the cooling water temperature was set as 0.3° C. The final product of EVOH pellet included a boron content as 248 ppm, alkali metal content of about 400 ppm, and a long diameter of 3 mm and a short diameter 2.4 mm in a round shape.

Production of EVOH Pellet for Exemplary Formulation E

To produce the EVOH pellet of Exemplary Formulation E, the two components (EVAC polymers) were formed by polymerizing ethylene and vinyl acetate monomers. The two components were separately saponified to form EVOH polymers. In contrast to the process for producing the EVOH of Exemplary Formulations A-D, the two components were not combined using solution mixing prior to saponification.

After saponification, the EVOH polymers were dissolved into two separate aqueous alcohol solutions of methanol and water, having a methanol to water ratio of 60:40. The two EVOH/methanol/water solutions each had a solid content of 41 wt. %. Subsequently, the EVOH/methanol/water solutions were combined by solution mixing and maintained at a temperature of 60° C. for one hour.

The EVOH/methanol/water solution was pumped to a feeding tube with a 60 L/min flow rate and then passed to an inlet pipe having a diameter of 2.5 mm. The EVOH was cut by a rotating knife, which was rotating at 1,000 rpm, as the pellet was cooled by adding water having a temperature of 3° C., thereby pelletizing by strand cutting to form an EVOH pellet. The EVOH pellet was centrifuged to separate EVOH particles. The separated EVOH particles were washed with water and then immersed into a boron/sodium acetate solution, and subsequently dried to obtain the final product of an EVOH pellet. The final product of EVOH pellet included a boron content of 30 ppm, an alkali metal content of about 264 ppm, and a diameter of 1.5 mm and a length of 5 mm with a cylindrical shape.

Production of EVOH Pellet for Exemplary Formulation F

An EVOH pellet was produced for Exemplary Formulation F, according to the formulation shown in Table 1, using a procedure similar to that used to produce the EVOH pellet of Exemplary Formulation E. However, to produce the EVOH pellet of Exemplary Formulation F, the EVOH/methanol/water solution was pumped to a feeding tube with a 120 L/min flow rate and then passed to an inlet pipe having a diameter of 2.8 mm. The EVOH was cut by a rotating knife, which was rotating at 1,500 rpm, as the pellet was cooled by adding water having a temperature of 2.1° C., thereby forming the EVOH pellet through underwater pelletizing. The EVOH pellet of Exemplary Formulation F included a boron content of 90 ppm, alkali metal content of about 345 ppm, and a long diameter of 3 mm and a short diameter of 2.4 mm in a round shape.

Production of EVOH Pellet for Exemplary Formulation G

An EVOH pellet was produced for Exemplary Formulation G, according to the formulation shown in Table 1, using a procedure similar to that used to produce the EVOH pellet of Exemplary Formulation E. However, to produce the EVOH pellet of Exemplary Formulation G, the EVOH/methanol/water solution was pumped to a feeding tube with a 120 L/min flow rate and then passed to an inlet pipe having a diameter of 2.8 mm. The EVOH was cut by a rotating knife, which was rotating at 1,000 rpm, as the pellet was cooled by adding water having a temperature of 1.5° C., thereby pelletizing by strand cutting to form an EVOH pellet. The EVOH pellet of Exemplary Formulation G included a boron content of 125 ppm, alkali metal content of about 201 ppm Production of EVOH Pellet for Exemplary Formulation H An EVOH pellet was produced for Exemplary Formulation H, according to the formulation shown in Table 1, using a procedure similar to that used to produce the EVOH pellet of Exemplary Formulation E. However, to produce the EVOH pellet of Exemplary Formulation H, the EVOH/methanol/water solution was pumped to a feeding tube with a 120 L/min flow rate and then passed to an inlet pipe having a diameter of 2.8 mm. The EVOH was cut by a rotating knife, which was rotating at 1,000 rpm, as the pellet was cooled by adding water having a temperature of 0.7° C., thereby pelletizing by underwater palletization to form an EVOH pellet. The EVOH pellet of Exemplary Formulation H included a boron content of 125 ppm, alkali metal content of about 201 ppm.

Production of EVOH Pellet for Comparative Formulations I

An EVOH pellet was produced for Exemplary Formulation I, according to the formulation shown in Table 1, using a procedure similar to that used to produce the EVOH pellet of Exemplary Formulation A. However, to produce the EVOH pellet for Exemplary Formulation I, the cooling water temperature was set as 1.8° C. The EVOH pellet included a boron content of 78 ppm, an alkali metal content of about 254 ppm, and a long diameter of 3 mm and a short diameter of 2.4 mm in a round shape.

Production of EVOH pellet for Comparative Formulations J

An EVOH pellet was produced for Exemplary Formulation J, according to the formulation shown in Table 1, using a procedure similar to that used to produce the EVOH pellet of Exemplary Formulation A. However, to produce the EVOH pellet for Comparative Formulations J, the cooling water temperature was set as 1.7° C. The EVOH pellet included a boron content of 173 ppm, an alkali metal content of about 170 ppm, and a long diameter of 3 mm and a short diameter of 2.4 mm in a round shape.

Production of EVOH pellet for Comparative Formulation K

To produce an EVOH pellet for Comparative Formulation K, the two components (EVAC polymers) were formed by polymerizing ethylene and vinyl acetate monomers. The two components were separately saponified to form EVOH polymers. After saponification, the EVOH polymers were dissolved into two separate aqueous alcohol solutions of methanol and water, having a methanol to water ratio of 70:30. The two EVOH/Methanol/water solutions each had a solid content of solution of 41 wt. %. Subsequently, the two EVOH/Methanol/water solutions were maintained a temperature of 60° C. for one hour.

The two EVOH/Methanol/water solutions were separately pumped to a feeding tube with a 60 L/min flow rate and then passed to an inlet pipe having a diameter of 2.5 mm. The two EVOH solutions were separately cut by a rotating knife, which was rotating at 1,000 rpm, as the pellets were cooled by adding water having a temperature of 2.2° C., thereby forming distinct EVOH pellets for each the two EVOH solutions. The EVOH pellets formed from the two EVOH solutions were centrifuged to separate EVOH particles, which were separately washed with water and then immersed into a boron/sodium acetate solution and subsequently dried to obtain two distinctive EVOH pellets.

The EVOH pellets formed from the two EVOH solutions were compounded by a twin screw extruded with a screw rotation speed of 100 rpm and a cylinder temperature of 205° C., and pelletized by strand cutting to obtain the final EVOH pellet of Comparative Formulation K. The process of compounding the two distinctive EVOH pellets included melting and mixing the two distinctive EVOH pellets. The final EVOH pellets included a boron content of 215 ppm, an alkali metal content of about 450 ppm, and a diameter of 1.5 mm and a length of 5 mm in a cylindrical shape.

Production of EVOH Pellet for Comparative Formulation L

An EVOH pellet for Comparative Formulation L was produced using a process similar to that used to produce the EVOH pellet of Exemplary Formulation A, except that the EVOH of Comparative Formulation L was cooled with water having a temperature of 0.9° C. and was compounded after formation of the boron immersed EVOH pellet. Specifically, after forming the EVOH/methanol/water solution, the EVOH/methanol/water solution was pumped to a feeding tube with a 60 L/min flow rate and then passed to an inlet pipe having a diameter of 2.5 mm. The EVOH was cut by a rotating knife, which was rotating at 1,000 rpm, as the pellet was cooled by adding water having a temperature of 0.9° C., thereby forming the EVOH pellet. The EVOH pellet was centrifuged to separate EVOH particles. The separated EVOH particles were washed with water and then immersed into a boron/sodium acetate solution, and subsequently dried to obtain an EVOH pellet of Comparative Formulation L.

The EVOH pellet was subsequently compounded using a compounding machine with a screw rotation speed of 100 rpm and a cylinder temperature of 205° C. Strand cutting was employed to obtain the final product of EVOH pellet. The obtained EVOH pellet included a boron content of 163 ppm, an alkali metal content of about 340 ppm, and a diameter of 1.5 mm and a length of 5 mm in a cylindrical shape.

Production of EVOH Pellet of Comparative Formulation M

An EVOH pellet for Comparative Formulation M was produced using a process similar to that used to produce the EVOH pellet of Exemplary Formulation A, except that Comparative Formulation M was not immersed into a boron/sodium acetate solution. Specifically, after the EVOH pellet of Comparative Formulation M was produced, the EVOH pellet was centrifuged to separate EVOH particles. The separated EVOH particles were washed with water, and subsequently dried to obtain the final EVOH pellet of Comparative Formulation M. The obtained EVOH pellet included a boron content of 0 ppm, an alkali metal content of about 0 ppm, and a diameter of circular in 1.5 mm and a length of 5 mm in a cylindrical shape.

Production of Comparative Formulation N

An EVOH pellet for Comparative Formulation N was produced using a process used similar to that used to produce the EVOH pellet of Exemplary Compositions E and F, except that Comparative Formulation N was immersed in cooling water with a temperature of 0.7° C. Specifically, after the EVOH pellet of Comparative Formulation N was produced, the EVOH pellet was centrifuged to separate EVOH particles. The separated EVOH particles were washed with water, and subsequently dried to obtain the final product of an EVOH pellet of Comparative Formulation N. The EVOH pellet included a boron content of 125 ppm, an alkali metal content of about 201 ppm, and a long diameter of 1.5 mm and a short diameter 1 mm with a round shape.

Production of Comparative Formulation O

An EVOH pellet was produced from Comparative Formulation O using a process similar to that used to produce EVOH pellet of Exemplary Compositions E and F, except that Comparative Formulation O was immersed in cooling water with a temperature of 1.5° C. After the EVOH pellet of Comparative Formulation O was produced, the EVOH pellet was centrifuged to separate EVOH particles. The separated EVOH particles were washed with water, and subsequently dried to obtain the final product of an EVOH pellet of Comparative Formulation O. The EVOH pellet included a boron content of 125 ppm, an alkali metal content of 201 ppm, a long diameter of 1.5 and a short diameter of 1 with a round shape.

Production of Comparative Formulation P

To produce an EVOH pellet for Comparative Formulation P, the two components (EVAC polymers) were formed by polymerizing ethylene and vinyl acetate monomers. The two components were separately saponified to form EVOH polymers. After saponification, the EVOH polymers were dissolved into two separate aqueous alcohol solutions of methanol and water, having a methanol to water ratio of 70:30. The two EVOH/Methanol/water solutions each had a solid content of solution of 41 wt. %. Subsequently, the two EVOH/Methanol/water solutions were maintained a temperature of 60° C. for one hour.

The two EVOH/Methanol/water solutions were separately pumped to a feeding tube with a 120 L/min flow rate and then passed to an inlet pipe having a diameter of 2.8 mm. The two EVOH solutions were separately cut by a rotating knife, which was rotating at 1,500 rpm, as the EVOH reached a cooled temperature of 1.8° C., thereby forming distinct EVOH pellets from the two EVOH solutions. The EVOH pellets formed from the two EVOH solutions were centrifuged to separate EVOH particles, which were separately washed with water and then immersed into a boron solution/sodium acetate solution and subsequently dried to obtain distinct EVOH pellets. The two EVOH pellets were dry blended using a blending machine to form the final product of an EVOH pellet of Comparative Formulation P. The obtained EVOH pellet included a boron content of 125 ppm, an alkali metal content of about 356 ppm, and a long diameter of 3 mm and a short diameter 2.4 mm with a round shape.

Example 2

Production of Mono-Layer, Multi-Layer Film, and Multi-Layer Structure

Mono-layer films and multi-layer films were formed from each of the EVOH pellets of Exemplary Formulations A-H and Comparative Formulations I-P. The mono-layer films (Exemplary Films A1-H1 and Comparative Films I1-P1) were produced by feeding the EVOH pellets of Exemplary Formulations A1-H1 and Comparative Formulations I1-P1 into a single layer T-die cast film extruder (Optical Control System MEV4). Exemplary Films A1-H1 and Comparative Films I1-P1 had a thickness of 20 pm. The extruder was set at a temperature of 220° C., the die was set at a temperature of 230° C. and the screw rotational frequency was 7 rpm.

Multi-layer films were formed from each of the EVOH pellets of Exemplary Formulations A-H and Comparative Formulations I-P by co-extruding the respective EVOH pellets, polypropylene, and a tie layer (e.g., ARKEMA OREVAC 18729). The multilayer films (Exemplary Films A2-H2 and Comparative Films I2-P2) had 5 layers with the EVOH layer sandwiched between two polypropylene layers. Tie layers were disposed between each side of the EVOH layer and one of the polypropylene layers. Specifically, EVOH pellet (I), polypropylene (II), and adhesive resin (III) were fed into a five layer co-extruder to produce a multi-layer sheet having a structure represented by: (II)/(III)/(I)/(III)/(II), with thicknesses of 300/25/50/25/300 (μm), respectively.

Figure 2:
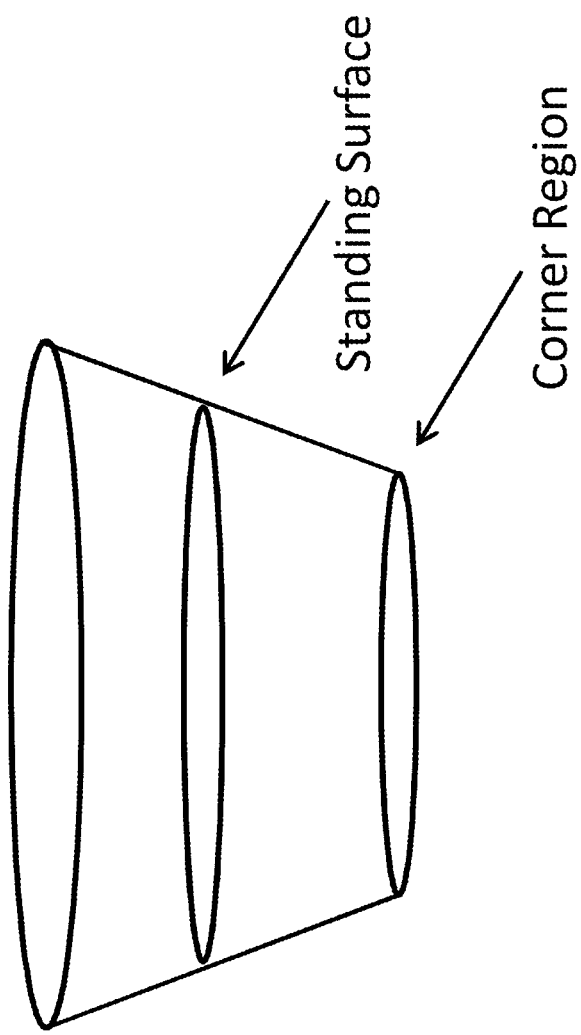
FIG. 2 is an image of an exemplary thermoformed multi-layer container with the standing surface region and corner surface region demarcated.

A multi-layer container was obtained by thermoforming Exemplary Films A2-H2 and Comparative Films I2-P2 into the shape of a container (e.g., a cup and/or cup-shaped container, such as a fruit cup). The multi-layer containers of Exemplary Films A2-H2 and Comparative Films I2-P2 were then cut with a knife and the thickness of the EVOH layer was measured at a standing surface region and at a corner surface region. FIG. 2 is an image of an exemplary thermoformed multi-layer container with the standing surface region and corner surface region demarcated.

Example 3

Ascertainment of Chemical and Physical Properties

The EVOH pellets formed from Exemplary Formulations A-H and Comparative Formulations I-P as well as the mono-layer films (Exemplary Films A1-H1 and Comparative Films I1-P1), multi-layer films (Exemplary Films A2-H2 and Comparative Films I2-P2), and multi-layer structures (as formed into an exemplary container shape) formed from the EVOH pellets were analyzed to determine various chemical and physical properties, including the gas barrier properties before and after thermoforming, the melting point temperature(s), the boron content, the uniformity, and the size of the dyed region of the respective pellets.

The melting point temperature(s) of the EVOH pellets of Exemplary Formulations A-H and Comparative Formulations I-P were determined using the method of ISO 11357-3-2011 with a DSC Q200 device (The Tzero lid was a TA Instrument T 170607 and the Tzero pan was a TA Instrument T 170620). The melting point of Exemplary Films A1-H1 and Comparative Films I1-P1 was also determined using the same method.

An EVOH pellet of Exemplary Formulations A-H and Comparative Formulations were cut through the long diameter using a microtome. As seen in Table 2, the cross section of the EVOH pellets of Exemplary Formulations A-H and Comparative Formulations I-P ranged from 1.18 to 12.57 $mm^2$. The cut EVOH pellet then received a drip of 0.01 mL of an iodine solution on the cut surface of each 10 mg sample. The iodine solution comprised: 8 g $I_2$+2 g KI+70 g $H_2O$. The cut EVOH pellet were dipped in water for 5 seconds and then placed in an oven at a temperature of 120° C. for 2 hours for drying.

The samples were cooled and then assessed using a LEICA DM2700M microscope, and a LEICA MC170HD CCD Camera, which are both commercially available from LEICA MICROSYSTEMS. The microscope lens were OFN25/N PLAN EPI/20×0.4BD, and the camera connection was to OM: C-M 0.55X. Specifically, the samples were assessed to determine R, G, B values of five random points in the marine area of the dyed cut surface for each sample under the lens using OM analysis software to determine the gray scale value. The gray scale value is calculated using the following formula:

Gray scale=$R*0.299+G*0.587+B*0.114$.

The marine area is defined as the region with lighter color in the OM for the preliminary analysis. The dyed region, as used herein, is the area where the gray value of such area differs from the average gray scale value of the marine area by more than 15 (e.g., by differing between ±15). The OM analysis software was also used to measure the size of the area.

Figure 3:
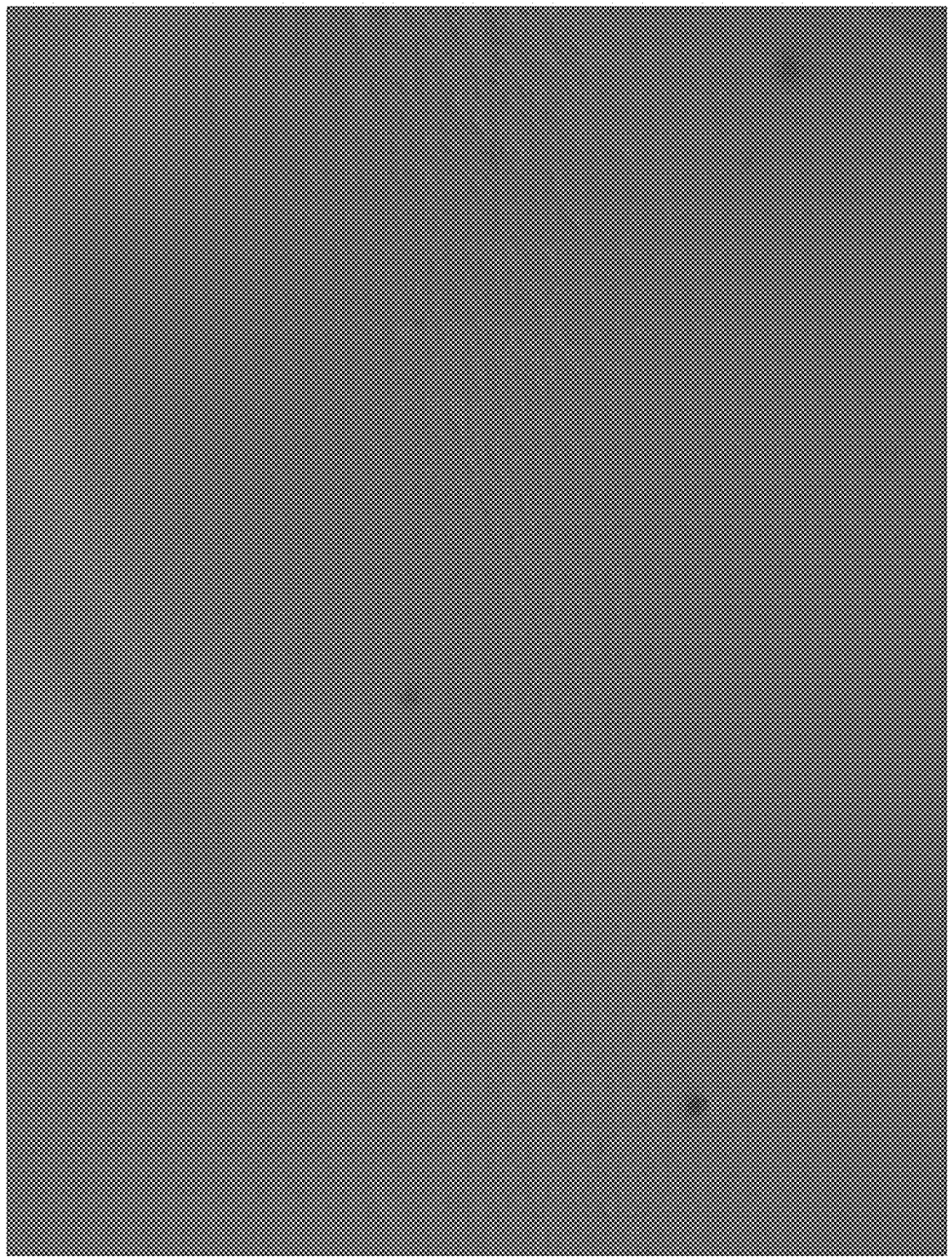
FIG. 3 provides an image of a surface of an exemplary EVOH pellet dyed with an iodine solution in accordance with aspects of the disclosure.
Figure 4:
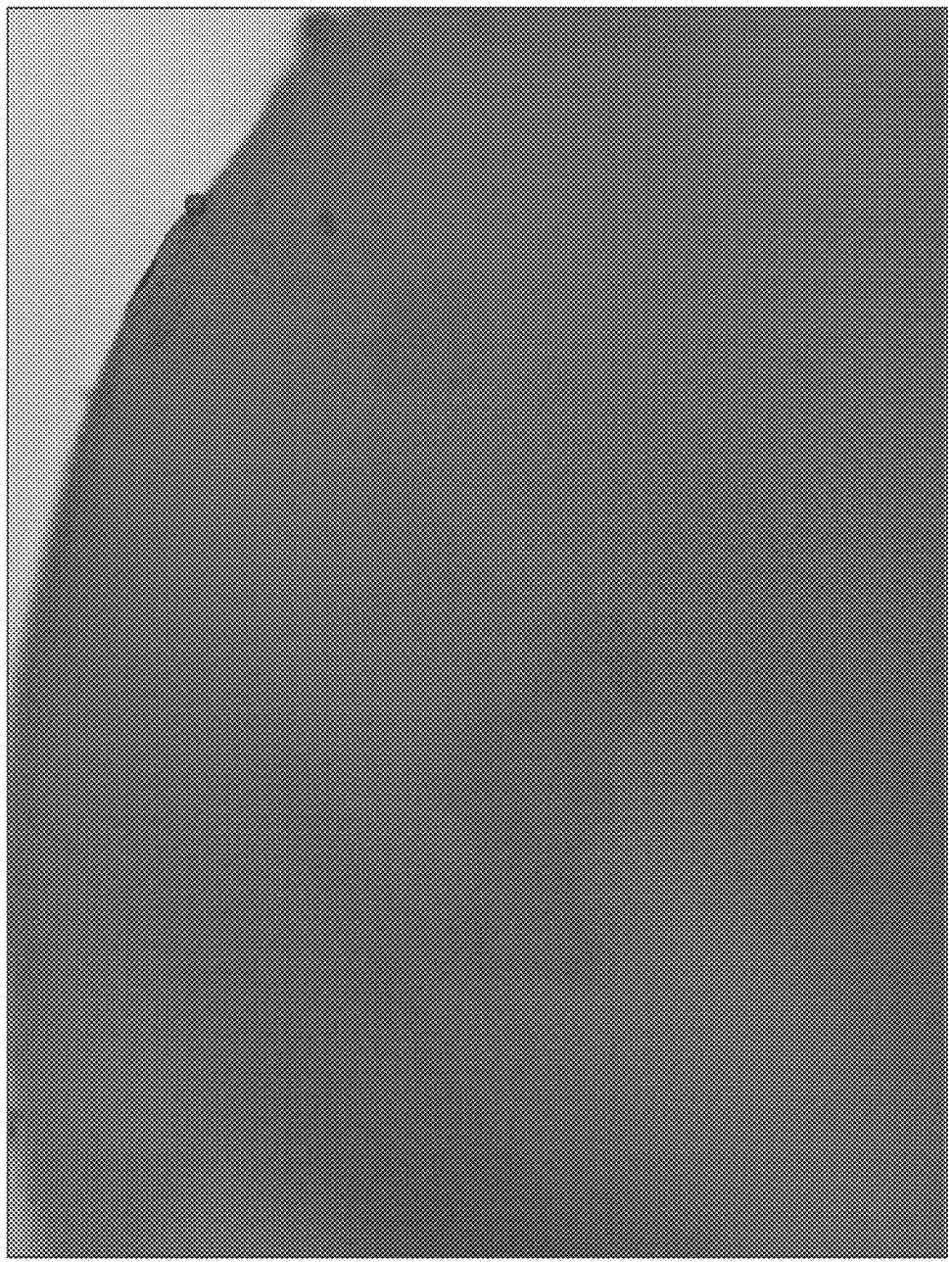
FIG. 4 provides an image of a surface of a comparative EVOH pellet dyed with an iodine solution according to aspects of the disclosure.

The samples for each of Exemplary Formulations A-H and Comparative Formulations I-P were determined to be "totally uniform" if there was no dyed region under the camera. The samples were determined to be "uniform" if each dyed region under the camera was less than or equal to 0.1 mm². The samples were determined to be "not uniform" if at least one dyed region was larger than 0.1 mm². FIG. 3 provides an image of a uniform surface of an exemplary EVOH pellet. FIG. 4 provides an image of a surface of a comparative EVOH pellet that is not uniform.

The parameters of the EVOH pellets were also assessed. For a round or ovular EVOH pellet, the maximum outer diameter of the EVOH pellet(s) was taken as a long diameter and the maximum diameter in a cross section having the greatest area among cross sections perpendicular to the long diameter was taken as the short diameter. For a cylindrical EVOH pellet, the greatest length perpendicular to the cross section was taken as the length, and the maximum diameter in a cross section was taken as the long diameter.

The boron content of the EVOH pellet for Exemplary Formulations A-H and Comparative Formulations I-P was also determined. A sample solution was formed from the EVOH pellets by breaking down 0.1 g samples of the EVOH pellets using concentrated nitric acid and a microwave. The sample solution was then diluted with pure water to adjust the concentration of the sample solution to 0.75 mg/ml. The amount of boron contained in the sample solution was measured using an ICP emission spectrochemical analysis device (ICP-OES) (analyzer: Thermo iCAP7000). The boron amount was a measurement value corresponding to the amount of boron derived from the boron compound used.

The alkali metal content of the EVOH pellet for Exemplary Formulations A-H and Comparative Formulations I-P was also determined. The dried EVOH pellets are incinerated, dissolved in an aqueous hydrochloric acid solution, and measured by an inductively coupled plasma emission spectrometer (ICP-AES). It can be determined by converting the value obtained by the method of quantifying the content of alkali metal from the calibration curve of the liquid into the content of the whole EVOH pellets.

The gas barrier properties of Exemplary Films A1-H1 and Comparative Films I1-PI and Exemplary Films A2-H2 and Comparative Films I2-P2 were assessed by determining the oxygen transmission rate (OTR) through such films. The OTR for the each of Exemplary Films A1-H1 and Comparative Films I1-P1 was determined at three different locations using the method of ISO 14663-2 with a mocon OXTRAN 2/22 device. The OTR testing was carried out at 65% relative humidity at 23° C. The OTR standard deviation was calculated using the difference between the OTR at the three locations. The OTR was also determined for Exemplary Films A2-H2 and Comparative Films I2-P2 using the method of ISO 14663-2 with a mocon OXTRAN 2/22 device at 65% relative humidity and 23° C.

The dyed region and the uniformity of Exemplary Films A1-H1 and Comparative Films I1-P1 were evaluated using procedures and equipment similar to those described above with respect to the EVOH pellets of Exemplary Formulations A-H and Comparative Formulations I-P. However, the testing area of Exemplary Films A1-H1 and Comparative Films I1-P1 was 32,000 μm².

The visual attributes of the thermoformed multi-layer containers Exemplary Films A2-H2 and Comparative Films I2-P2 were assessed. Specifically, the difference in the thickness of the EVOH layer at the corner region compared to the thickness of the EVOH layer at the standing region was determined for each of the thermoformed multi-layer containers.

Table 2, provided below, shows the results of the analysis of the melting point temperature(s), the boron content, the uniformity, and the size of the dyed region of the respective EVOH pellets. Table 3 shows the results of the melting point temperature, gas barrier property, and the size of the dyed region of the mono-layer films Exemplary Films A1-H1 and Comparative Films I1-P1. Table 4 shows the results of the analysis of the gas barrier property of the multi-layer films Exemplary Films A2-H2 and Comparative Films I2-P2 as well as the visual appearance of the containers thermoformed therefrom.

TABLE 2

| | $1^{st}$ $T_{Melt}$ (° C.) | $2^{nd}$ $T_{Melt}$ (° C.) | $3^{rd}$ $T_{Melt}$ (° C.) | $\Delta T_{Melt}$ (° C.) | Boron Content (ppm) | Cross-Sectional Area (mm²) | Size of dyed region (mm²) | Uniformity |
|---|---|---|---|---|---|---|---|---|
| Exemplary Formulation A | 180° | 169° | — | 11° | 62 | 5.65 | 0.1~0.003 | Uniform |
| Exemplary Formulation B | 181° | 143° | — | 38° | 85 | 5.65 | ND | Totally Uniform |
| Exemplary Formulation C | 191° | 177° | | 14° | 113 | 1.77 | 0.02~0.0009 | Uniform |
| Exemplary Formulation D | 186° | 162° | 145° | 41° | 248 | 5.65 | 0.001~0.00001 | Uniform |
| Exemplary Formulation E | 191° | 162° | — | 29° | 30 | 1.77 | 0.05~0.008 | Uniform |
| Exemplary Formulation F | 179° | 145° | — | 34° | 90 | 5.65 | ND | Totally Uniform |

TABLE 2-continued

| | 1st $T_{Melt}$ (°C.) | 2nd $T_{Melt}$ (°C.) | 3rd $T_{Melt}$ (°C.) | $\Delta T_{Melt}$ (°C.) | Boron Content (ppm) | Cross-Sectional Area (mm$^2$) | Size of dyed region (mm$^2$) | Uniformity |
|---|---|---|---|---|---|---|---|---|
| Comparative Formulation G | 195° | 173° | — | 22° | 125 | 12.57 | 0.003~0.0002 | Uniform |
| Comparative Formulation H | 195° | 172° | — | 23° | 125 | 1.18 | 0.08~0.001 | Uniform |
| Comparative Formulation I | 193° | 121° | — | 72° | 78 | 5.65 | 82.1~0.3 | Not Uniform |
| Comparative Formulation J | 180° | — | — | — | 173 | 5.65 | ND | Totally Uniform |
| Comparative Formulation K | 183° | 165° | — | 18° | 215 | 1.77 | 1.6~0.2 | Not Uniform |
| Comparative Formulation L | 188° | 164° | — | 24° | 163 | 1.77 | 0.9~0.15 | Not Uniform |
| Comparative Formulation M | 181° | 168° | — | 13° | 0 | 1.77 | 1.3~0.33 | Not Uniform |
| Comparative Formulation N | — | 173° | — | — | 125 | 1.18 | ND | Totally Uniform |
| Comparative Formulation O | 191° | — | — | — | 25 | 12.57 | ND | Totally Uniform |
| Comparative Formulation P | 183° or 162° | — | — | 21° | 125 | 7.07 | ND | Not Uniform |

TABLE 3

| | 1st $T_{Melt}$ (°C.) | 2nd $T_{Melt}$ (°C.) | 3rd $T_{Melt}$ (°C.) | $\Delta T_{Melt}$ (°C.) | Size of dyed region (μm$^2$) | Film Testing Area (μm$^2$) | OTR at 3 location of mono-layer film | OTR Standard Deviation |
|---|---|---|---|---|---|---|---|---|
| Exemplary Film A1 | 181° | 164° | — | 17° | 985~125 | 32000 | 0.51/0.46/0.53 | 0.036 |
| Exemplary Film B1 | 182° | 143° | — | 39° | ND | 32000 | 0.52/0.54/0.48 | 0.03 |
| Exemplary Film C1 | 195° | 177° | — | 18° | 625~53 | 32000 | 0.7/0.72/0.68 | 0.02 |
| Exemplary Film D1 | 186° | 160° | 142° | 44° | 123~0.8 | 32000 | 0.52/0.49/0.49 | 0.017 |
| Exemplary Film E1 | 195° | 159° | — | 36° | 432~15 | 32000 | 0.54/0.47/0.49 | 0.036 |
| Exemplary Film F1 | 179° | 142° | — | 37° | ND | 32000 | 0.73/0.72/0.76 | 0.02 |
| Comparative Film G1 | 195° | 173° | — | 22° | 54~0.2 | 32000 | 0.69/0.71/0.71 | 0.011 |
| Comparative Film H1 | 195° | 172° | — | 23° | 133~2.1 | 32000 | 1.05/1.03/1.02 | 0.015 |
| Comparative Film I1 | 195° | 118° | — | 77° | 8620~6432 | 32000 | 0.62/0.78/0.54 | 0.122 |
| Comparative Film J1 | 180° | — | — | — | ND | 32000 | 0.32/0.35/0.41 | 0.046 |
| Comparative Film K1 | 183° | 164° | — | 19° | 2134~1151 | 32000 | 0.32/0.58/0.79 | 0.235 |
| Comparative Film L1 | 189° | 164° | — | 25° | 10012~7763 | 32000 | 0.35/0.54/0.23 | 0.156 |
| Comparative Film M1 | 181° | 164° | — | 17° | 1763~1018 | 32000 | 0.51/0.64/0.43 | 0.105 |
| Comparative Film N1 | — | 173° | — | — | ND | 32000 | 0.56/0.61/0.33 | 0.15 |
| Comparative Film O1 | 191° | — | — | — | ND | 32000 | 0.22/0.19/0.21 | 0.07 |
| Comparative Film P1 | 183° or 159° | — | — | 24° | 21023~11321 | 32000 | 0.31/0.67/1.2 | 0.447 |

TABLE 4

| | Thickness Deviation | Visual Appearance | OTR of multi-layer film |
|---|---|---|---|
| Exemplary Film A2 | O | O | 0.0065 |
| Exemplary Film B2 | O | O | 0.0078 |
| Exemplary Film C2 | O | O | 0.0052 |
| Exemplary Film D2 | Δ | O | 0.012 |

TABLE 4-continued

|  | Thickness Deviation | Visual Appearance | OTR of multi-layer film |
| --- | --- | --- | --- |
| Exemplary Film E2 | Δ | O | 0.021 |
| Exemplary Film F2 | O | O | 0.015 |
| Exemplary Film G2 | O | O | 0.0057 |
| Exemplary Film H2 | O | O | 0.011 |
| Comparative Film I2 | X | X | 1.08 |
| Comparative Film J2 | X | X | 1.12 |
| Comparative Film K2 | X | X | 0.85 |
| Comparative Film L2 | X | X | 0.54 |
| Comparative Film M2 | Δ | X | 0.15 |
| Comparative Film N2 | Δ | X | 0.32 |
| Comparative Film O2 | X | X | 1.5 |
| Comparative Film P2 | X | X | 0.98 |

The column heading of "Thickness Deviation" refers to the difference in the thickness of the EVOH layer in thermoformed multi-layer container at the corner region as compared to the standing region, which was produced from the multi-layer films of Exemplary Films A2-H2 and Comparative Films I2-P2. A "0" was given to EVOH layers having a thickness that differed between the corner region and the standing region by less than 20%. A "a" was given to EVOH layers having a thickness that differed between the corner region and the standing region by 20% to 40%. An "X" was given to EVOH layers having a thickness that differed between the corner region and the standing region by more than 40%.

The column heading of "Visual Appearance" refers to the visual assessment of the thermoformed containers formed from the multi-layer films of Exemplary Films A2-H2 and Comparative Films I2-P2. A "0" was given to containers that did not have a pitted surface based on a visual assessment. An "X" was given to containers that had a pitted surface based on a visual assessment.

Figure 5:
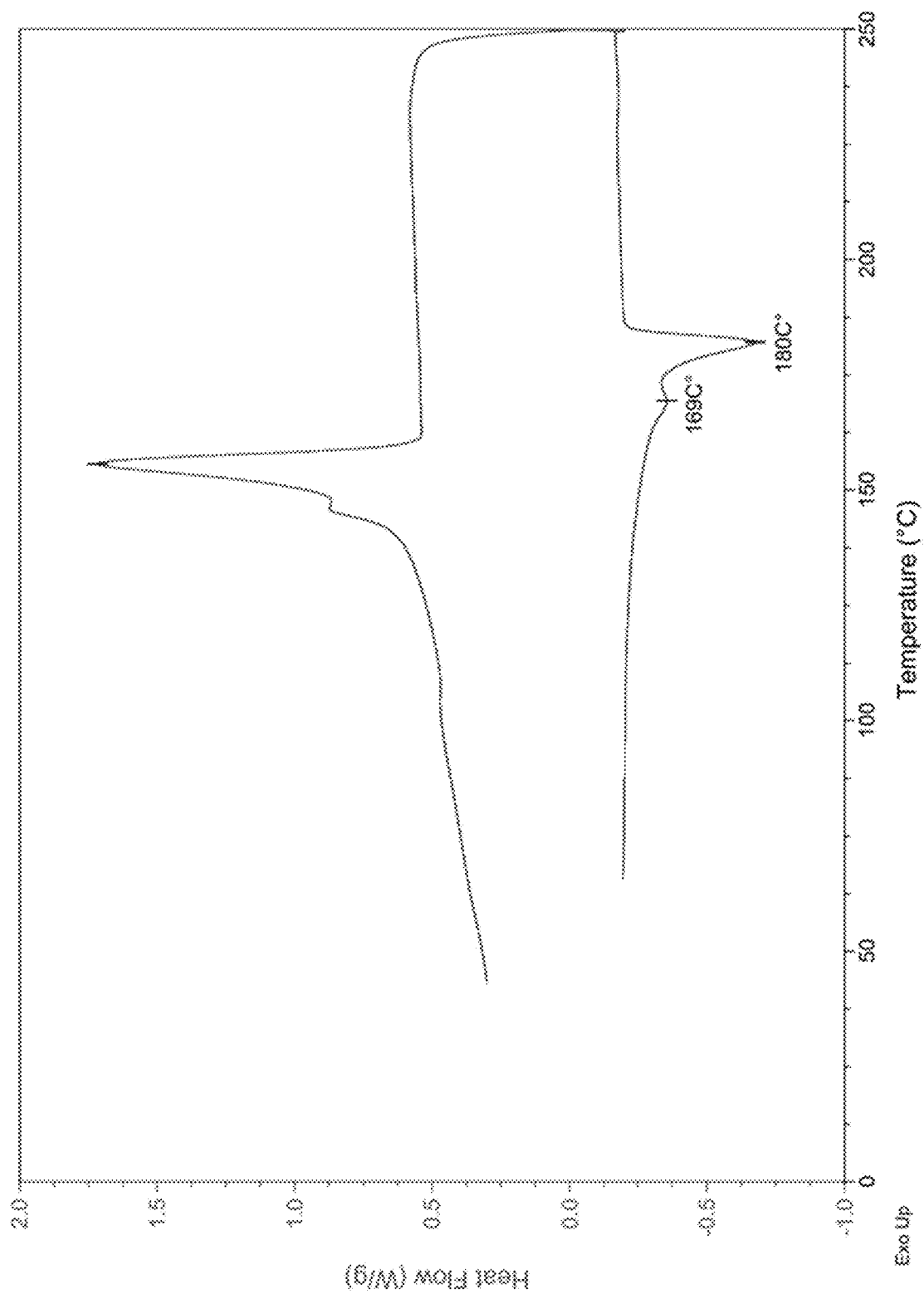
FIG. 5 is a graph of the two melting point temperatures of an exemplary EVOH resin according to aspects of the disclosure.

As shown by Table 2, the EVOH pellets of Exemplary Formulations A-H each exhibited at least two distinct melting point temperatures. Without being bound by any particular theory, it is believe that the EVOH pellets of Comparative Formulation J exhibited only one melting point temperature because the two components each had a melting point temperature that was very close to each other. FIG. 5 is an exemplary graph showing an EVOH pellet having two melting point temperatures.

The EVOH pellet of Comparative Formulation I had a difference in the melting point temperatures of 72° C., which was outside of the desired range of 10 to 44° C. Additionally, the mono-layer film Comparative Film I1 had melting point temperatures with the difference of the melting point temperatures being out of range. Without being limited to any specific theory, the inventors ascribe at least the inferior appearance and the undesirable difference in the thickness of the EVOH layer of the thermoformed multi-layer container of Comparative Film I2 to the difference in the melting point temperatures of the EVOH pellet of Comparative Formulation I being outside the aforementioned desired range.

The EVOH pellet of Comparative Formulation J did not exhibit two distinct melting point temperatures. It is believed that at least the inferior appearance and the undesirable difference in the thickness of the EVOH layer in the thermoformed container formed from Comparative Film J2 is due to the EVOH pellet of Comparative Formulation J not exhibiting two distinct melting point temperatures.

The mono-layer film Comparative Film J1 exhibited only one melting temperature. The thermoformed multi-layer container of Comparative Film J2 exhibited an inferior appearance and undesirable difference in the thickness of the EVOH layer in the thermoformed multi-layer container between the corner region and the standing region.

The pellets of Comparative Formulation K had dyed region outside the desired ranges discussed herein and was determined to be not uniform. Comparative Film K1, which was produced from the pellets of Comparative Formulation K, also had a dyed region outside the desired ranges. The standard deviation of oxygen transmission rate for Comparative Film K1 was 0.235 (i.e. 23.5%). The thermoformed multi-layer container of Comparative Film K2 exhibited an inferior appearance and undesirable difference in the thickness of the EVOH layer in the thermoformed multi-layer container between the corner region and the standing region. Additionally, the oxygen transfer rate of the multi-layer container of Comparative Film K2 was 0.85, which is significantly greater than the oxygen transfer rates of the Exemplary Films A2-H2.

Similarly Comparative Film L1 had a dyed region outside the desired ranges and OTR standard deviation that was greater than that of Exemplary Films A1-H1. The thermoformed multi-layer container of Comparative Film L2 exhibited an inferior appearance and undesirable difference in the thickness of the EVOH layer between the corner region and the standing region.

Comparative Film M2 exhibited an inferior visual appearance and had a poor deviation in the thickness. Additionally, Comparative Film M1 exhibited undesirably high amount of OTR standard deviation. The inferior visual appearance of Comparative Film M1 may be attributable to crystallization effects in the EVOH pellet of Comparative Formulation M. The EVOH pellet of Comparative Formulation M did not undergo boron dipping.

Comparative Formulation N had only one melting point. Comparative Film N1 and the multi-layer structure of Comparative Film N2 exhibited poor OTR standard deviation and OTR of the multi-layer film, respectively.

Similarly, Comparative Formulation O had only one melting point. Comparative Film O1 included an undesirably high standard deviation of OTR. Additionally, multi-layer structure of Comparative Film O2 had an inferior appearance, inferior deviation of thickness between the corner region and the standing region, and an undesirably high OTR of multi-layer film.

The EVOH pellet(s) formed of Comparative Formulation P were produced by way of dry blending. Two distinctive EVOH pellets were formed from Comparative Formulation P, each with a mono (although different) melting point temperature. Comparative Film P1 had a dyed region that was undesirable large and exhibited inferior standard deviation of OTR. The thermoformed multi-layer container of Comparative Film P2 exhibited an inferior appearance and undesirable difference in the thickness of the EVOH layer between the corner region and the standing region. Additionally, the thermoformed multi-layer container of Comparative Film P2 exhibited an OTR that was higher than that of the thermoformed multi-layer container of Exemplary Films A2-H2.

Additionally, the mono-layer films of Exemplary Films A1-H1 exhibited surprisingly superior uniform gas barrier properties as compared to the Comparative Films. Specifically, the mono-layer films of Exemplary Films A1-H1 exhibited an OTR standard deviation that was unexpectedly better than the OTR standard deviation of Comparative Films I1-P1. For example, the average OTR standard deviation exhibited by Exemplary Films A1-H1 was 0.0231, while the average OTR standard deviation exhibited by Comparative Films I1-P1 was 0.166, which is about 719% larger than the average OTR standard deviation exhibited by Exemplary Films A1-H1.

The multi-layer films of Exemplary Films A2-H2 also exhibited surprisingly superior gas barrier properties as compared to Comparative Films I2-P2. For example, the average OTR exhibited by the Comparative Films I1-P1_was about 7,767% larger than the average OTR exhibited by multi-layer films of Exemplary Films A2-H2.

As used herein, all ranges provided are meant to include every specific range within, and combination of sub ranges between, the given ranges. Additionally, all ranges provided herein are inclusive of the end points of such ranges, unless stated otherwise. Thus, a range from 1-5, includes specifically 1, 2, 3, 4 and 5, as well as sub ranges such as 2-5, 3-5, 2-3, 2-4, 1-4, etc.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

As used herein, the terms "comprising," "having," and "including" are used in their open, non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within +/−5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol copolymer resin composition comprising:
   a first ethylene-vinyl alcohol copolymer having a first ethylene content;
   a second ethylene-vinyl alcohol copolymer having a second ethylene content, the second ethylene content being different from the first ethylene content;
   at least two melting point temperatures; and
   a boron compound,
      wherein the ethylene-vinyl alcohol copolymer resin composition has a boron content of about 25 to about 300 ppm, and
      wherein when the ethylene-vinyl alcohol copolymer resin composition is in the form of a pellet, the pellet having an iodine dyed region of about 0.1 mm$^2$ or less after dripping 0.01 mL of iodine solution on the surface of the ethylene-vinyl alcohol copolymer resin composition, dipping the ethylene-vinyl alcohol copolymer resin composition into water for 5 seconds, and drying at a temperature of 120° C. for 2 hours.

2. The ethylene-vinyl alcohol copolymer resin composition of claim 1, wherein the boron content is about 30 to about 300 ppm.

3. The ethylene-vinyl alcohol copolymer resin composition of claim 1, wherein the iodine dyed region is 0.02 mm$^2$ or less.

4. The ethylene-vinyl alcohol copolymer resin composition of claim 1, wherein a difference of the at least two melting point temperatures is about 10° C. to about 44° C.

5. The ethylene-vinyl alcohol copolymer resin composition of claim 1, wherein a difference of the at least two melting point temperatures is about 15° C. to about 41° C.

6. The ethylene-vinyl alcohol copolymer resin composition of claim 4, wherein one of the at least two melting point temperatures is from 142° C. to 177° C.

7. The ethylene-vinyl alcohol copolymer resin composition of claim 4, wherein one of the at least two melting point temperatures is from 179° C. to 195° C.

8. The ethylene-vinyl alcohol copolymer resin composition of claim 1, wherein the first ethylene content is in the range of about 20 to about 35 mole % and the second ethylene content is in the range of about 36 to about 65 mole %.

9. The ethylene-vinyl alcohol copolymer resin composition of claim 1, further comprising alkali metal, wherein the alkali metal content of the ethylene-vinyl alcohol resin composition is from 50 to 400 ppm.

10. The ethylene-vinyl alcohol copolymer resin composition of claim 1, wherein the ethylene-vinyl alcohol copolymer resin composition is in the form of pellet.

11. A multi-layer structure comprising:
   (a) at least one layer formed from the ethylene-vinyl alcohol copolymer resin composition of claim 1;
   (b) at least one polymer layer; and
   (c) at least one adhesive layer.

12. The multi-layer structure of claim 11, wherein the polymer layer is selected from the group consisting of a low density polyethylene layer, a polyethylene-graft-maleic-anhydride layer, a polypropylene layer, and a nylon layer and the adhesive layer is a tie layer.

13. The multi-layer structure of claim 11 having an oxygen transmission rate of 0.021 cc/pkg*day or less after thermoforming of the multilayer structure.

* * * * *